United States Patent
Algüera Gallego

(10) Patent No.: US 11,465,597 B2
(45) Date of Patent: Oct. 11, 2022

(54) HAND CRANK FOR A LANDING GEAR

(71) Applicant: JOST-WERKE DEUTSCHLAND GMBH, Neu-Isenburg (DE)

(72) Inventor: José Manuel Algüera Gallego, Aschaffenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 27 days.

(21) Appl. No.: 16/941,921

(22) Filed: Jul. 29, 2020

(65) Prior Publication Data
US 2021/0031733 A1   Feb. 4, 2021

(30) Foreign Application Priority Data
Jul. 31, 2019  (DE) .................. 10 2019 005 385.0

(51) Int. Cl.
*B60S 9/08* (2006.01)
*G05G 1/08* (2006.01)

(52) U.S. Cl.
CPC ............... *B60S 9/08* (2013.01); *G05G 1/085* (2013.01)

(58) Field of Classification Search
CPC .......... G05G 1/085; B60S 9/08; B25G 1/007; A01K 89/006; A01K 89/009; F16D 2300/24; F16D 2300/14; Y10T 74/20744; Y10T 74/2075; Y10T 74/20756; Y10T 74/20762
See application file for complete search history.

(56) References Cited

U.S. PATENT DOCUMENTS

| | | | | |
|---|---|---|---|---|
| 2,156,200 A * | 4/1939 | Smyers | ................ | B25G 1/007 74/548 |
| 2,712,765 A * | 7/1955 | Knight, Jr. | ............ | B25G 1/007 81/58.3 |
| 3,603,171 A * | 9/1971 | Dodge | ................. | G05G 1/085 74/548 |
| 5,101,684 A * | 4/1992 | Mosslacher | ............ | B60J 7/057 296/223 |
| 5,199,738 A * | 4/1993 | VanDenberg | ............ | B60S 9/08 280/766.1 |
| 5,238,266 A * | 8/1993 | VanDenberg | ............ | B60S 9/08 280/766.1 |
| 5,526,713 A * | 6/1996 | Walter | ................. | G05G 1/085 403/103 |

(Continued)

FOREIGN PATENT DOCUMENTS

DE          7605307 U      7/1976
DE    202008005202 U      5/2009

*Primary Examiner* — Daniel D Yabut
(74) *Attorney, Agent, or Firm* — Hudak, Shunk & Farine Co. LPA

(57) ABSTRACT

A hand crank for a landing gear is described, the hand crank having a main body provided at a first end with a connecting element for fastening the hand crank to an input shaft of the landing gear and formed at an opposite, second end to rotate the hand crank. The hand crank only allows torque to be transmitted from the hand crank to the input shaft if the operator holds the hand crank with at least one hand. A clutch is arranged in the force flow between the first end of the main body and the connecting element, wherein the clutch is held in an open disconnected position and is moved into a force-locked connection position by operating an actuating element arranged at the second end.

17 Claims, 5 Drawing Sheets

(56) References Cited

U.S. PATENT DOCUMENTS

| | | | | |
|---|---|---|---|---|
| 6,623,035 B1* | 9/2003 | Schneider | ................ | B60S 9/04 |
| | | | | 248/161 |
| 6,846,016 B2* | 1/2005 | VanDenberg | ............. | B60S 9/08 |
| | | | | 248/188.2 |
| 2017/0235326 A1* | 8/2017 | Koschinat | ................ | F16D 3/26 |
| | | | | 74/625 |

* cited by examiner

HAND CRANK FOR A LANDING GEAR

FIELD OF THE INVENTION

The invention relates to a hand crank for a landing gear including a main body provided at a first end with a connecting element for fastening the hand crank to an input shaft of the landing gear and formed at an opposite, second end to rotate the hand crank. In addition, the invention is also implemented on a landing gear.

BACKGROUND OF THE INVENTION

Landing jacks are often mounted in pairs on semitrailers and keep them at a constant height after separation from a towing vehicle. For this purpose, the landing jacks can be telescoped and are usually adjusted with a hand crank between a retracted and an extended position. The operator stands on the side of the semi-trailer and turns the hand crank clockwise or counter-clockwise to raise or lower the semi-trailer. For safety reasons, the operator should stand securely and operate the crank handle with both hands on a crank sleeve without letting go until the intended extension state of the landing gear(s) is reached.

Document DE 76 05 307 U discloses a corresponding hand crank with a main body having at the first end a connecting element in the form of a fork piece, which is permanently fastened to the input shaft of a landing gear by means of a bolt. When not in use, the hand crank can be tilted away with respect to the input shaft and hung in a crank holder. The crank can be locked in a position of use by actuating a spring-loaded lug and moving the crank with respect to the drive shaft. Occasionally, however, contrary to the safety instructions, in particular when lowering the trailer, the operator sometimes sets the hand crank in a rapid rotary movement with one hand and releases the hand crank, so that the hand crank performs a few rotations due to the angular momentum.

This practice allows the trailer to lower uncontrollably during the phase in which the hand crank is not held by the operator. There is also a risk for the operator to be hit and injured by the rapidly rotating hand crank.

SUMMARY OF THE INVENTION

The object of the invention was therefore to provide a hand crank which only allows torque to be transmitted from the hand crank to the input shaft if the operator holds the hand crank with at least one hand.

The underlying object of the invention is solved with a hand crank for a landing gear, the hand crank comprising: a main body provided at a first end with a connecting element for fastening the hand crank to an input shaft of the landing gear and formed at an opposite, second end to rotate the hand crank, wherein a clutch is arranged in the force flow between the first end of the main body and the connecting element, wherein the clutch is held in an open disconnected position and is moved into a force-locked connection position by operating an actuating element arranged at the second end. The hand crank can be fastened to the input shaft of a landing gear with the connecting element. The connecting element ensures a permanent, mechanical connection of the crank handle and the input shaft with respect to the input shaft.

At the second end of the main body there is preferably arranged a crank sleeve rotatably mounted in its circumferential direction, on which the operator grips the hand crank and sets it in rotation. As an alternative to a crank sleeve, the second end can also be formed with a smooth surface which slides over the palm of the operator's hand with little friction when the hand crank is actuated.

Typically, the first and second ends of the main body are aligned axially parallel to one another. A central part of the main body arranged between the first and second ends runs essentially perpendicular to the first and second ends of the main body. The connecting means engages on the first end of the main body and, depending on the switching position of a clutch arranged on the first end, is connected to the first end either in a rotationally fixed or rotatable manner. When the hand crank is actuated, the second end rotates around the first end at a distance from the central part.

The clutch is connected via a force transmission means to the actuating element arranged at the second end of the main body, so that an operator can only extend the landing gear if he simultaneously operates the actuating element during a rotary movement of the hand crank, preferably by means of the crank sleeve. When actuated, the actuating element initiates a closing of the clutch in a force-locked connection position. The force-locked connection position can be realized by a positive connection or a frictional connection of the clutch. This initially has the advantage that the input shaft rotates and thus the landing gear(s) does/do not move unless the hand crank remains in the operator's hand during operation. The operation using the angular momentum without holding the hand crank could still take place, but does not lead to a movement of the landing gear(s) since no torque is transmitted to its input shaft due to the clutch then being opened. As a result, the operator refrains from accelerating the crank handle at all with an angular momentum and then releasing it, so that the risk of being hit by a crank handle that is uncontrollably wobbling around the input shaft is also reduced.

The clutch and the actuating element are preferably connected to one another via a force transmission means. The force transmission means can be a tensile force element, in particular a rope, a Bowden cable or a chain, or a compressive force element, in particular a pressure cable, a pressure chain or a hydraulic transmitter. A Bowden cable is understood to mean a movable machine element for transmitting a mechanical movement as well as compressive and tensile forces by means of a flexible combination of a wire rope and a sheath that is pressure-resistant in its axial direction.

The clutch advantageously has a release rod to which the force transmission means is fastened. With the help of the power transmission means, the release rod can be moved with respect to the first end, in particular in its axial direction. Depending on whether the release rod comes into a rotationally fixed or a rotatable connection position with the first end by a movement in the axial direction, the clutch is in an open disconnected position or a force-locked connection position.

According to a particularly favorable embodiment, the release rod engages in a rotationally fixed manner on the connecting element and is designed with a torque receiving section. The torque receiving section can have a polygonal or oval profile in cross section, which allows form-fitted torque transmission with the main body. Alternatively, an elastic or roughened element for a frictional torque transmission can also be present.

It has proven to be particularly useful if the clutch has a torque transmission section which is arranged in a stationary manner at the first end of the main body. The torque transmission section is formed complementary to the torque receiving section, so that when the clutch is actuated by means of the actuating element and the force transmission means, the torque receiving section and the torque transmission section interlock. The torque receiving section is preferably formed on the inside of the main body or is formed from a section-wise deformation of the main body in the region of the first end.

The release rod is expediently guided so as to be displaceable in the axial direction with respect to the main body, and when the actuating element is actuated, the torque receiving section engages with the torque transmission section.

In an open disconnected position of the clutch, the torque receiving section is arranged contactlessly with the first end of the main body. When the actuating element is actuated, the torque receiving section moves in the axial direction and comes into engagement with the torque transmission section, so that the clutch is in a force-locked connection position. In the force-locked connection position of the clutch, the torque receiving section is surrounded concentrically by the torque transmission section, in particular in the radial direction.

The torque transmission section can have a cross section which is shaped complementary to the torque receiving section. As a result, the torque receiving section can be received by the torque transmission section in a force-locked connection position of the clutch.

The clutch can, for example, be held in an open disconnected position by a spring element.

The main body is preferably a tube and the clutch and/or the spring element is/are arranged inside that tube. This leads to the advantage that, in particular in the region of the first end, no components protrude from the main body. The force transmission means can also extend through the inside of the main body in the axial direction from the first end to the second end. A tube is understood to be an elongated hollow body having a length which is generally much greater than its diameter. The tube is made of a material that is rigid under the expected operational loads and can have a circular cross section, which is the optimal design for the most common applications. An increased stiffness can also be achieved with rectangular, oval and other cross sections. The main body is regularly designed as an integral tubular body.

According to a first advantageous embodiment, the spring element is a compression spring element or tension spring element arranged at the first end. With a compression spring element, the restoring force of the spring element is a compression force and with a tension spring element it is a tension force.

The compression spring element or the tension spring element is advantageously held stationary with respect to the release rod with an end section and stationary with respect to the first end of the main body.

According to a second, alternative embodiment, the spring element can be a tension spring element arranged at the second end of the main body.

The tension spring element is expediently fixed with one end section to the actuating element and with an opposite end section to the second end of the main body.

The actuating element is expediently slidably mounted with respect to the second end of the main body, in particular in the axial elongation of the second end. As a result, the actuating element can be operated simultaneously while the crank sleeve is rotating and rotates around the second end of the main body, so that the operator does not have to grip around on the hand crank and the hand crank does not slip over the actuating element while rotating.

A particularly advantageous embodiment can be achieved if the actuating element has an attachment point for the force transmission means. An actuation of the actuating element thus leads directly to an adjustment of the attachment point of the force transmission means and thus to a change in the switching position of the clutch. In the opened disconnected position of the clutch the attachment point is preferably in a close position next to the second end of the main body.

In the force-locked connection position of the clutch, the attachment point is located in a spaced position with respect to the second end of the main body.

The attachment point advantageously comprises an adjusting device for adjusting the length of the force transmission means. The adjusting device is used in particular to adjust the length of the force transmission means and thereby the point of a force-locked connection position of the clutch. This is useful, for example, in order to compensate for tolerances of the individual components and to compensate for wear-related changes in length of the power transmission means.

An embodiment is particularly preferred in which the actuating element is an actuating sleeve which at least partially overlaps the second end of the main body in the axial direction. In the overlapping area, the actuating sleeve is held radially by the second end. The actuating sleeve can be slidably guided in the axial direction with respect to the second end for switching the clutch into a force-locked connection position.

The actuating sleeve should at least partially project from the crank sleeve. In this embodiment, the actuating sleeve is arranged in the radial direction between the second end and the crank sleeve.

The actuating sleeve is advantageously mounted so as to be rotatable with respect to the crank sleeve and the second end of the main body. The actuating sleeve is thereby decoupled from the rotary movement of the crank sleeve and rotates freely with respect to the second end of the main body. This has the advantage that the actuating sleeve can be comfortably held by a second hand of the operator without turning in the palm of the hand.

According to a further embodiment, a lever can be pivotally mounted on the actuating element or on the crank sleeve, wherein the load arm is supported by the second end of the main body. The lever simplifies an axial adjustment of the actuating element in the axial direction of the second end of the main body.

The spring element expediently engages the actuating element or the crank sleeve and the lever. As a result, the lever is pulled into a position protruding with respect to the actuating element or the crank sleeve and can be gripped by an operator. The crank sleeve is expediently mounted on the second end of the main body in such a way that axial forces can be transmitted. This is particularly necessary if the operator actuates the lever and the actuating element has moved into a position disengaged with respect to the second end due to the action of the lever.

An axial drive path of the actuating element can preferably correspond to an axial drive path of the release rod and/or an axial drive path of the connecting element.

The invention also relates to a landing gear with an input shaft and a hand crank described above, the landing gear having an outer sleeve and an inner sleeve telescopically guided therein with a support foot formed on the end side thereof and the inner sleeve being movable relative to the outer sleeve by actuating the hand crank in the force-locked connection position of the clutch.

BRIEF DESCRIPTION OF THE DRAWINGS

For a better understanding, the invention is explained in more detail below with reference to 10 figures showing in FIG. 1 is a perspective view on a pair of landing gears with a hand crank.

DETAILED DESCRIPTION OF THE INVENTION

Figure 1:
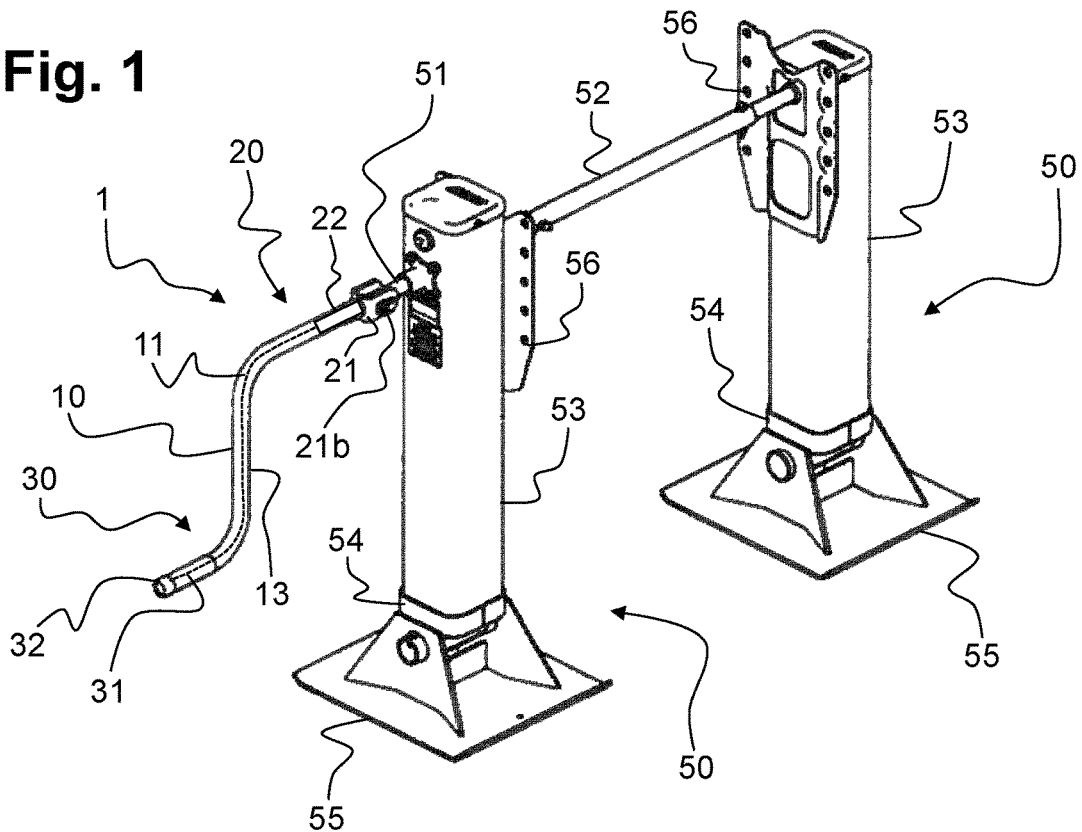

FIG. 1 shows a perspective view on a pair of landing gears 50 each having an outer sleeve 53 with a square profile and an inner sleeve 54 slidably guided therein with the same profile shape. In their upper section, the outer sleeves 53 each have a mounting plate 56, with which the landing gears 50 are fastened to a vehicle, in particular to a semitrailer (not shown).

In order to set the extended state of the inner sleeve 54 with respect to the associated outer sleeve 53 which is fixedly attached to the vehicle, an input shaft 51 protrudes from the landing gear 50 located in front of the image plane being connected in a rotationally fixed manner to a hand crank 1. The input shaft 51 is kinematically coupled to a connecting shaft 52 running between the two landing gears 50, so that the inner sleeves 54 of both support jacks 50 are retracted or extended simultaneously by rotating the hand crank 1 clockwise or counterclockwise. Each inner sleeve 54 is extended until support feet 55 arranged at the free ends of the inner sleeves 54 stand on the ground and hold the load of the vehicle acting in the direction of normal force.

After coupling of the trailer, the inner sleeves 54 are retracted until they are almost completely received by their associated outer sleeve 53 as shown in FIG. 1.

The hand crank 1 has a main body 10 with an essentially Z-shape. A first end 20 of the main body 10 faces the input shaft 51 and carries a connecting element 21 designed as a fork piece, which projects over the input shaft 51 on two opposite sides and passes through the input shaft 51 by means of a connecting bolt 21b.

A second end 30 of the main body 10 is aligned axially parallel to the first end 20 and carries a crank sleeve 31 which is rotatably mounted thereon. The crank sleeve 31 is taken by the hand of the operator for moving the extension state of the landing gears 50 by rotating the hand crank 1 about the input shaft 51. Between the first end 20 and the second end 30 runs a middle part 13 of the main body 10, the axial extent of which extends essentially perpendicular to the axial extent of the first and second ends 20, 30.

At the second end 30, an actuating element 32 is also arranged directly adjacent to the crank sleeve 31, with which a clutch 22 located at the first end 20 can be operated. The actuating element 32 is mounted in particular in the axial extension of the crank sleeve 31 and can be gripped by the hand of the operator for actuation. The actuating element 32 is connected to the clutch 22 arranged at the first end 20 by means of a force transmission means 11. The force transmission means 11 runs over its entire axial length within the main body 10 and is indicated in FIG. 1 as a dotted line.

Figure 2:
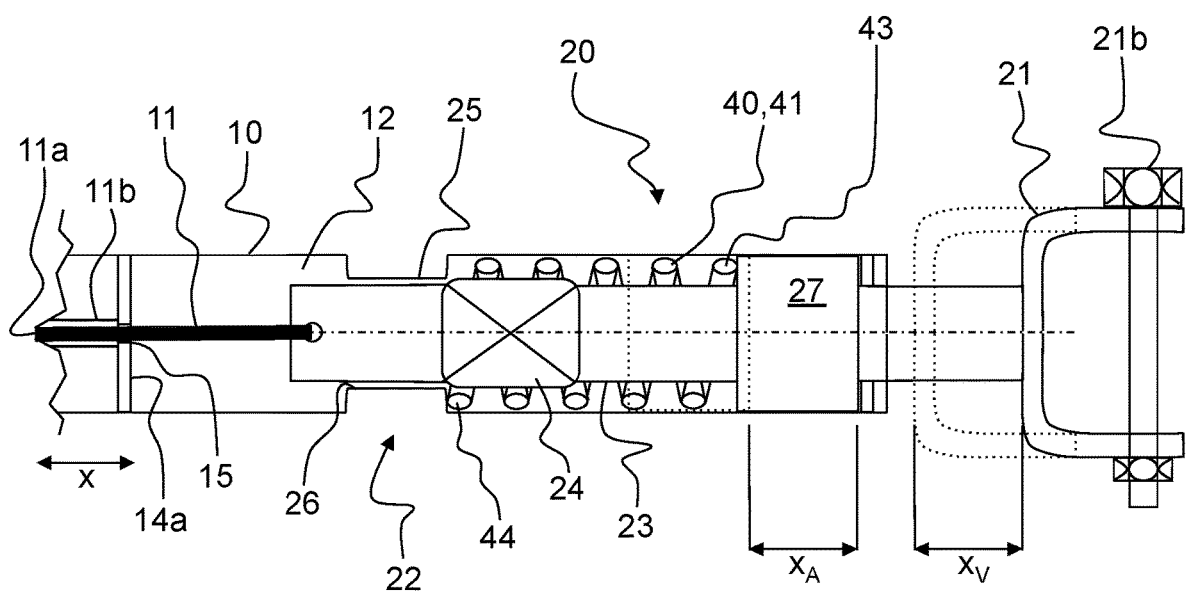
FIG. 2 is a cross-sectional view through a first end of a main body of the hand crank according to a first embodiment in the disconnected position of the clutch.

FIG. 2 shows a cross section of the first end 20 of the main body 10 with the clutch 22 installed therein. The main body 10 is designed as a tube with an interior 12 which receives the clutch 22 in such a way that no components protrude from the main body 10 in the radial direction.

The clutch 22 comprises, as necessary components, a release rod 23 with a one-piece, integrally formed torque receiving section 24 interacting with the torque transmission section 25 in the force-locking connection position.

The release rod 23 engages in a rotationally fixed manner on the connecting element 21 and extends coaxially into the interior 12 of the first end 20. In the interior 12, the release rod 23 is formed in sections with a support piston 27, which projects radially in the direction of the inner wall of the first end 20 of the main body 10 relative to the release rod 23. The support piston 27 has an outer diameter which corresponds approximately to the inner diameter of the interior 12 and thereby gives the release rod 23 lateral guidance during movement in the axial direction x.

The force transmission means 11 engages the end section of the release rod 23 inserted into the first end 20 and moves the release rod 23 in its axial direction x depending on the position of the actuating element 32. The force transmission means 11 preferably comprises a Bowden cable, the wire rope 11a of which engages the release rod 23 and is guided through an opening 15 arranged in an inner retaining wall 14a of the main body 10. The pressure-resistant case 11b of the Bowden cable is supported on the inner retaining wall 14a around the opening 15.

The torque receiving section 24 of the release rod 23 is oriented in accordance with FIG. 2 in the open disconnected position of the clutch 22 in an axially offset manner with respect to a torque transmission region 25 which is complementary shaped at the first end 20.

The torque receiving section 24 and the torque transmission section 25 can in particular be formed from a polygonal, star-shaped or oval profile, which forms a positive connection as soon as the torque receiving section 24 and the torque transmission section 25 are displaced in the axial direction x and come into active engagement.

Figure 3:
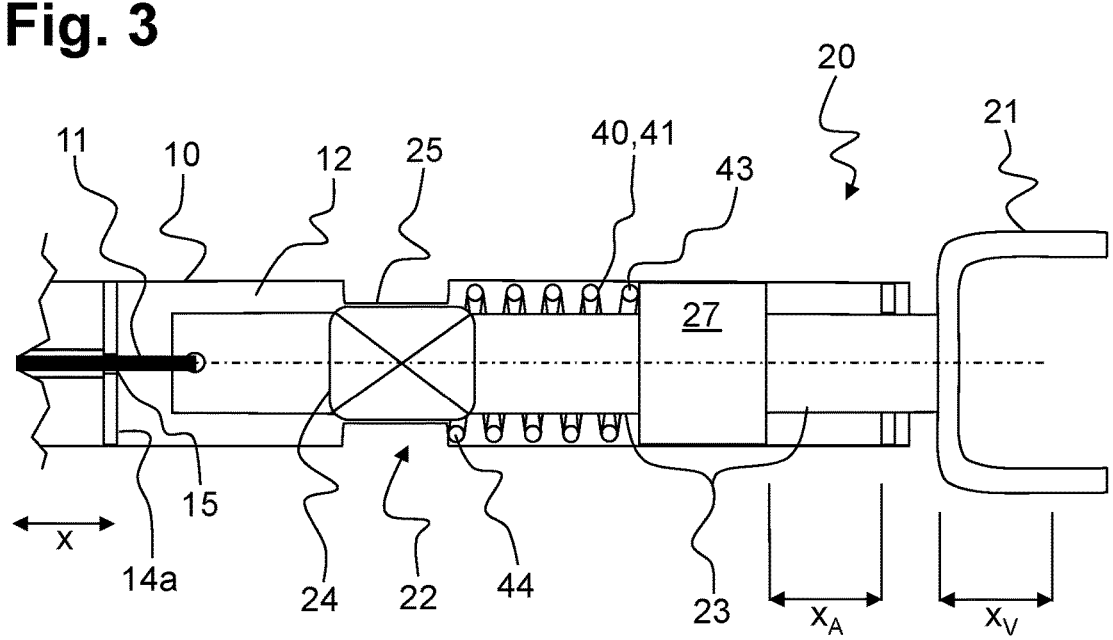
FIG. 3: a cross-sectional view through a first end of a main body of the hand crank according to the embodiment in FIG. 2 in force-locking connection position of the clutch.

In the opened disconnected position of the clutch 22, the torque receiving section 24 is located in the image plane to the right of the torque transmission section 25, is moved to the left by a tensile force applied by the force transmission means 11 to the release rod 23 to reach a force-locked connection position, and thereby moves into the torque transmission section 25 as can be seen particularly well in FIG. 3.

The torque transmission section 25 is designed to be stationary at the first end 20 of the main body 10, in particular by compression molding.

Without a tensile force being transmitted from the actuating element 32 to the force transmission means 11, a spring element 40, which in the embodiment of FIGS. 2 and 3 is designed as a compression spring element 41, presses the release rod 23 to the right in the image plane, so that the clutch 22 is in an open disconnected position and no torque is transmitted to the connecting element 21 when the hand crank 1 rotates.

The spring element 40 is supported with its end section 43 on a stationary section of the release rod 23; in the exemplary embodiment shown on an end face of the support piston 27, With its opposite end section 44, the spring element 40 contacts a fixed portion of the first end 20 of the main body 10; in the shown embodiment on an end face of a smaller-diameter cross section 26 of the torque transmission section 25 within the interior 12.

The spring element 40 of the embodiment according to FIG. 2 and FIG. 3 is inserted into an annular space between the release rod 23 and the inner wall of the first end 20 and surrounds the release rod 23 coaxial. The spring element 40 is designed in terms of its axial length and its spring constant such that the torque receiving section 24 is pressed out of the torque transmission section 25 in the axial direction by the spring element 40 without the external force of the actuating element 32.

FIG. 3 shows the force-locked connection position of the clutch 22, in which the torque receiving section 24 of the release rod 23 is drawn into the free cross section 26 of the torque transmission section 25 by the force transmission means 11 against the spring force of the spring element 40. The release rod 23 has moved into the first end 20 of the main body 10 according to drive path $x_A$ and has taken the connecting element 21, which is formed thereon, by the same amount according to drive path $x_V$. The force-locked connection position of the clutch 22 is maintained as long as the operator actuates the actuating element 32 arranged at the second end 30 of the main body 10 and applies a tensile force to the release rod 23 via the force transmission means 11 which is greater than the spring force of the spring element 40.

If, contrary to the safety instruction, the operator releases the crank handle 1 and thus also the actuating element 32 during actuation, the spring element 40 pulls the release rod 23 and with it the torque receiving section 24 out of the torque transmission section 25 and automatically brings the clutch 22 into an open disconnected position which no longer transmits torque to the input shaft 51 of the landing gear 50.

Figure 4:
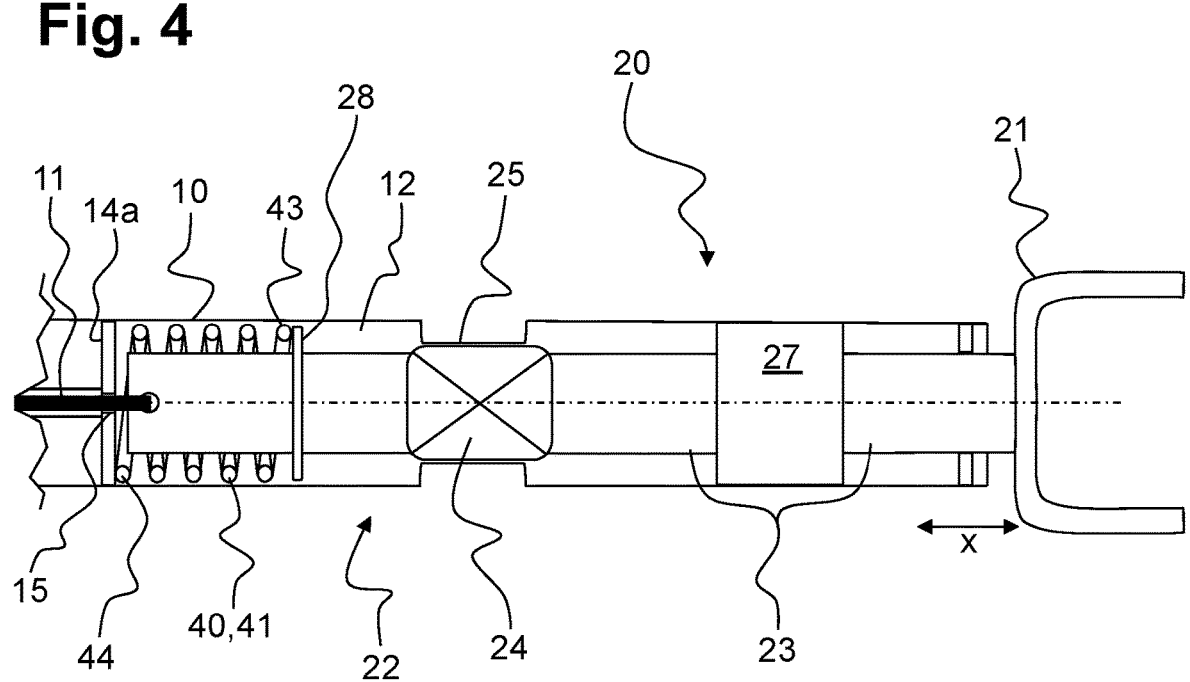
FIG. 4 is a cross-sectional view through a first end of a main body of the hand crank according to a second embodiment in force-locking connection position of the clutch.

An alternative embodiment is shown in FIG. 4, in which the spring element 40 is also designed as a compression spring element 41 and is arranged in a section of the first end 20, seen from the connecting element 21, beyond the torque transmission section 25. The spring element 40 is supported here with its end section 43 on a support ring 28 which is designed to be stationary on the release rod 23 and with its opposite end section 44 on the inner retaining wall 14a which is arranged in the first end 20 of the main body 10.

Figure 5:
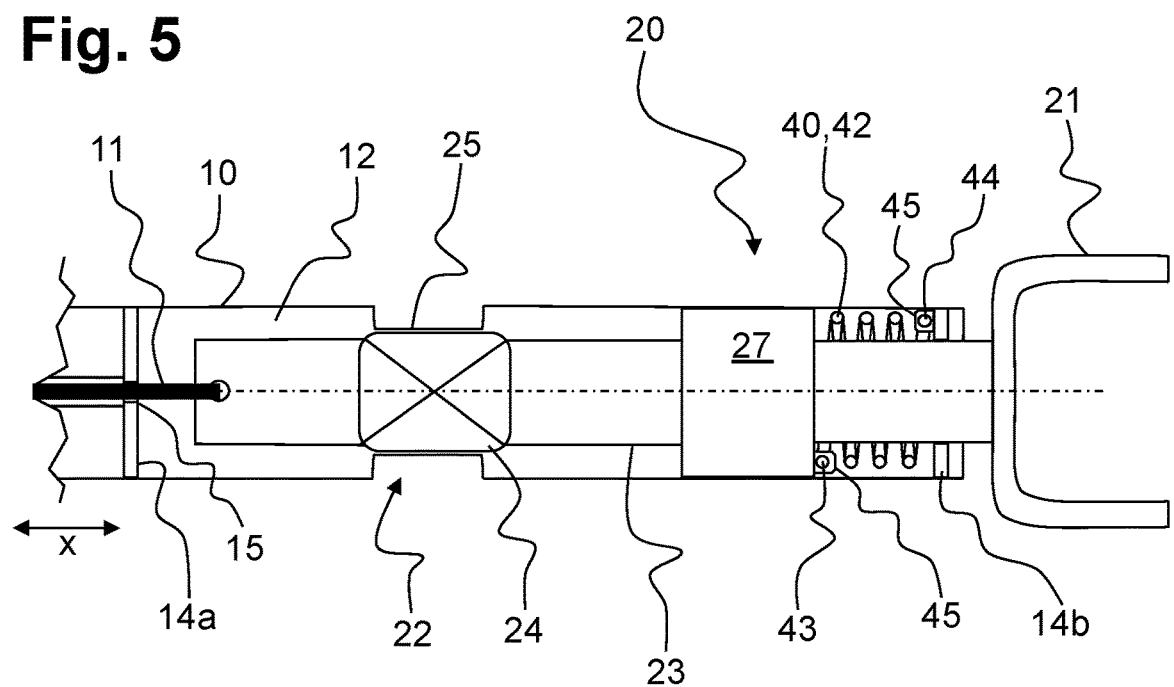
FIG. 5 is a cross-sectional view through a first end of a main body of the hand crank according to a third embodiment in the force-locking connection position of the clutch.

FIG. 5 shows a further exemplary embodiment with a spring element 40 in the form of a tension spring element 42. The tension spring element 42 is stretched by actuating the force transmission means 11 and, when the tensile force continues, allows the torque receiving section 24 of the release rod 23 to be displaced into the torque transmission section 25. Without a tensile force applied by the force transmission means 11, the release rod 23 together with the torque receiving section 24 is moved in the axial direction x of the connecting element 21 due to the restoring force of the tension spring element 42 and released from the active engagement with the torque transmission section 25.

The tension spring element 42 is arranged between an outer retaining wall 14b formed on the free end of the first end 20 and the end face of the support piston 27 and is fixed to the support piston 27 and to the outer retaining wall 14b by means of a tension spring fastener 45 respectively. The tension spring element 42 is located in an annular space between the inner wall of the first end 20 and the release rod 23 and preferably surrounds the release rod 23 coaxially.

Figure 6:
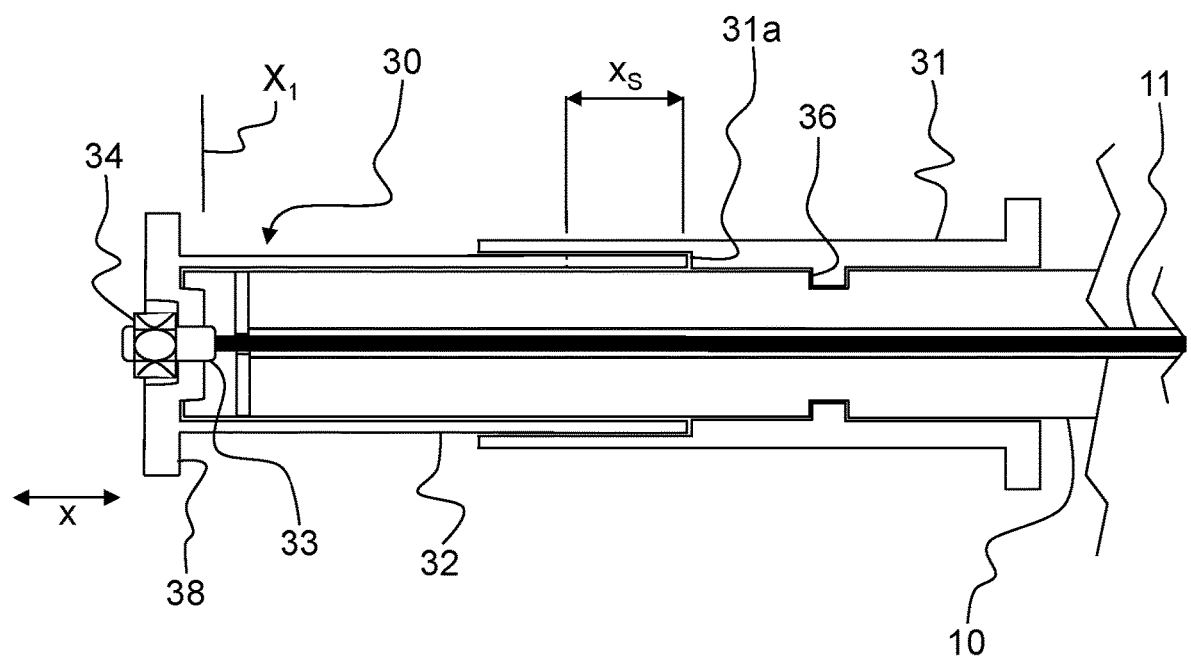
FIG. 6 is a cross-sectional view through a second end of a main body of the hand crank according to a fourth embodiment in the disconnected position of the clutch.

FIG. 6 shows an enlarged cross section of the second end 30 of the main body 10, on which the crank sleeve 31 is rotatably mounted. A displacement of the crank sleeve 31 relative to the second end 30 is prevented in the axial direction x by means of a thrust bearing 36.

The main body 10 passes through the crank sleeve 31 completely and also carries, preferably also rotatably mounted, the actuating element 32. FIG. 6 shows the actuating element 32 arranged at the second end 30 when the clutch 22 arranged at the first end 20 is in the disconnected position.

The actuating element 32 is designed as an actuating sleeve and projects axially into the crank sleeve 31, which has an enlarged inner diameter 31a for this purpose. The actuating element 32 is immersed at most in the enlarged inner diameter 31a. In the region of the enlarged inner diameter 31a, the crank sleeve 31 overlaps the actuating sleeve 32 in the radial direction. This overlapping section is chosen to be larger in the axial direction x than a drive path $x_S$ of the actuating element 32, which in turn corresponds to the drive path $x_A$ of the release rod 23 and the drive path $x_V$ of the connecting element 21 at the first end 20. This ensures that the actuating element 32, regardless of its position variable in the axial direction x, is always overlapped by the actuating sleeve 32, which is held stationary in the axial direction x, and is guided in the radial direction.

The force transmission means 11 is fastened to the actuating element 32 in a attachment point 33, the attachment point 33 being in a near position $X_1$ close to the second end 30. The attachment point 33 can be adjustable in the axial direction x by means of an adjusting device 34, so that a preload of the force transmission means 11 can be set. The preload of the force transmission means 11 should be selected such that the unactuated actuating element 32 is pulled against the enlarged inner diameter 31a of the crank sleeve 31 without clearance. Because of its thrust bearing 36, the crank sleeve 31 forms an abutment for the actuating element 32.

Figure 7:
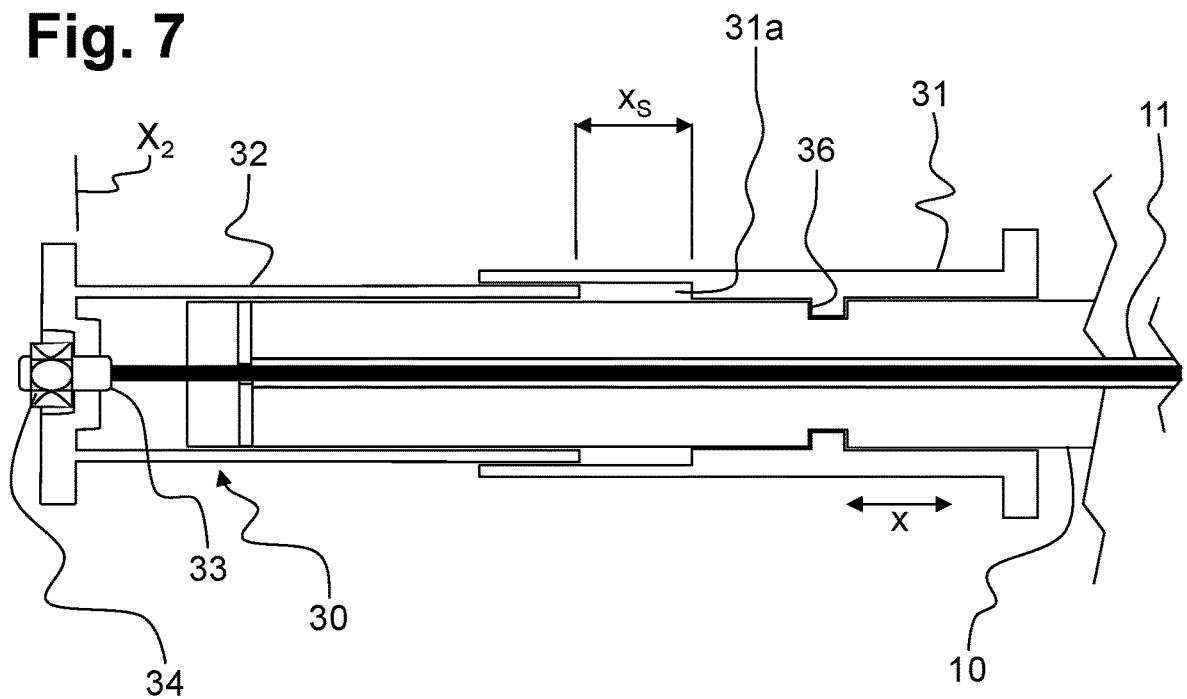
FIG. 7 is a cross-sectional view through a second end of a main body of the hand crank according to the embodiment in FIG. 6 in the force-locking connection position of the clutch.

In FIG. 7, the actuating element 32 is moved to the left in the image plane by the drive path $x_S$ and held there, so that the attachment point 33 of the force transmission means 11 is in a spaced position $X_2$ from the second end 30. The actuating element 32 has thereby brought the torque receiving section 24 located at the first end 20 into active engagement with the torque transmission section 25.

Figure 8:
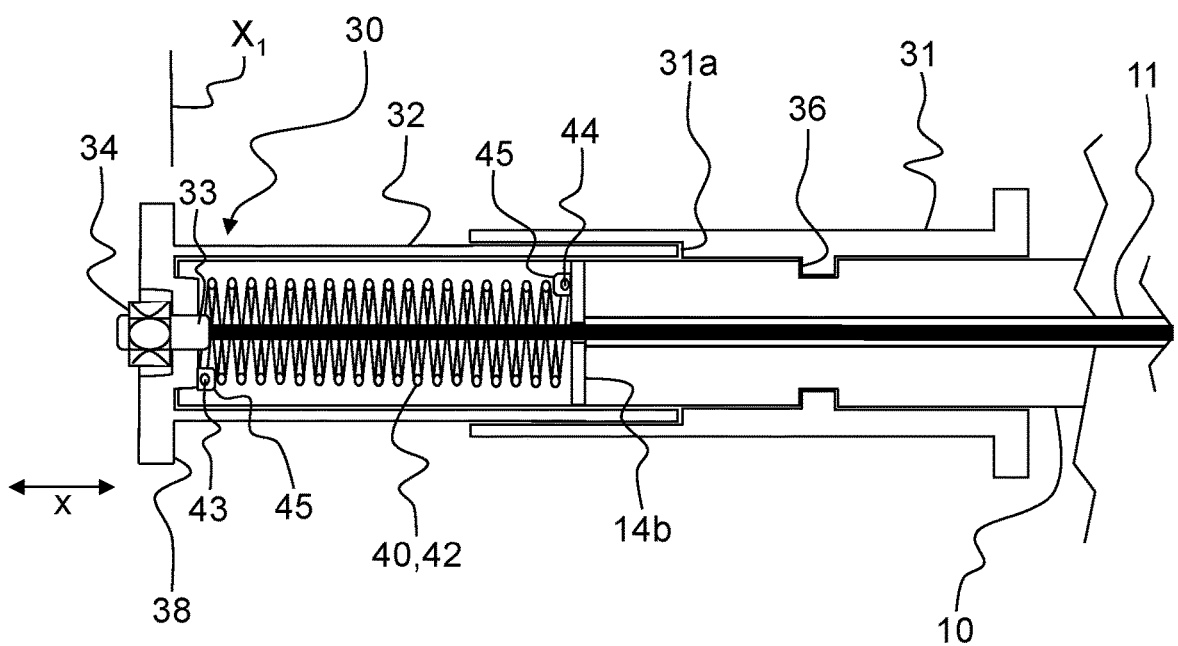
FIG. 8 is a cross-sectional view through a second end of a main body of the hand crank according to a fifth embodiment in the disconnected position of the clutch.

FIG. 8 shows a further embodiment in which the spring element 40 is arranged in the region of the second end 30 of the main body 10. In this embodiment, if a shear-resistant force transmission means 11 is used, a spring element 40 in the region of the first end 20 is not necessary.

The spring element 40 according to FIG. 8 is used as a tension spring element 42 and is fixed with its end section 43 to the second end 30 of the main body 10, preferably to an outer retaining wall 14b, and with its opposite end section 44 to the actuating element 32 by means of a tension spring fastener 45 and passes concentrically through the actuating element 32. The tension spring element 42 has pulled the actuating element 32 as far as possible towards the second end 30, so that the attachment point 33 of the force transmission means 11 has reached a close position $X_1$ with respect to the second end 30 of the main body 10.

The side of the actuating element 32 facing the second end 30 completely fills out the enlarged inner diameter 31a and is supported in this area in the axial direction x on the crank sleeve 31. The tension spring element 42 is received over its entire extent by the actuating element 32 designed as an actuating sleeve.

In the above-described embodiments relating to the second end 30 according to FIGS. 6 to 8, the actuating element 32 is formed on its side facing away from the second end 30 with a collar 38 preferably closed in the circumferential direction which prevents slipping off the hand of the operator in an axial direction x.

Figure 9:
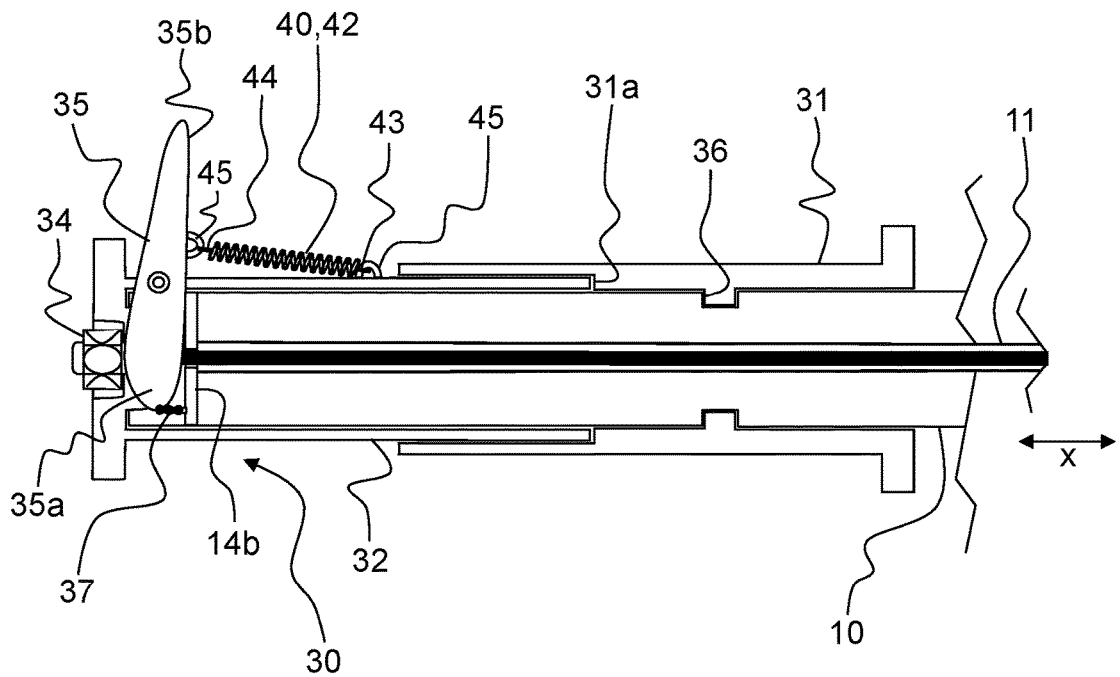
FIG. 9 is a cross-sectional view through a second end of a main body of the hand crank according to a sixth embodiment in the disconnected position of the clutch and FIG. 10 is a cross-sectional view through a second end of a main body of the hand crank according to the embodiment in FIG. 9 in the force-locking connection position of the clutch.
Figure 10:
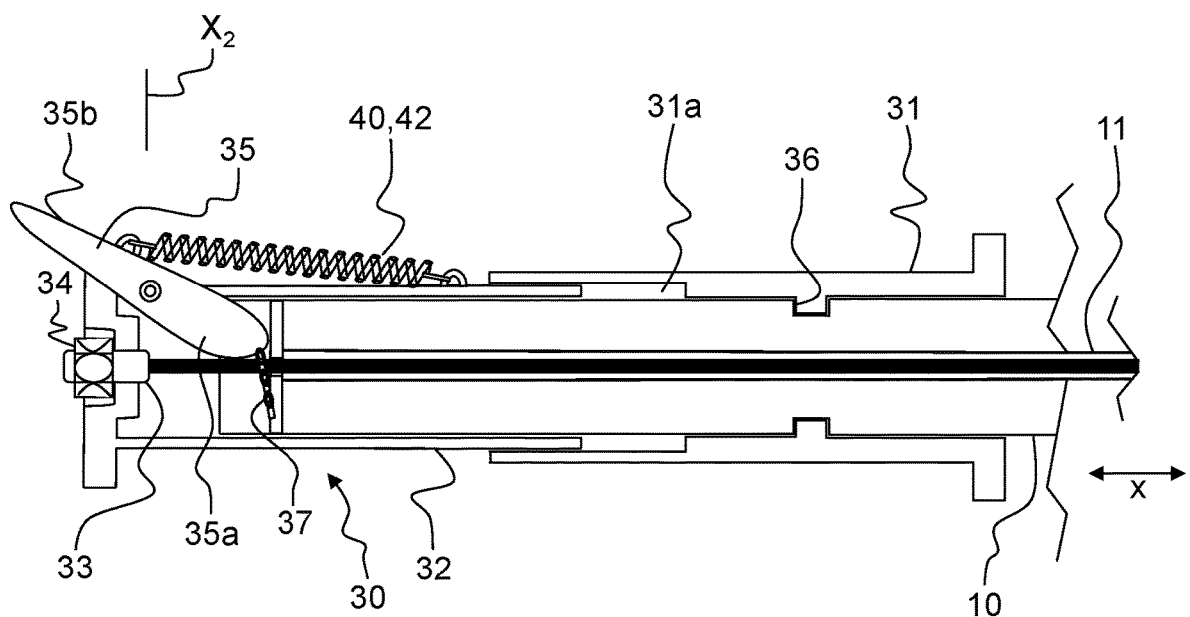

An even more convenient operation can be achieved by means of a lever 35 pivotably mounted on the actuating element 32 according to the embodiment shown in FIG. 9 and FIG. 10. The pivotable lever 35 has a load arm 35a, which, regardless of its position, always extends into the interior of the actuating element 32 designed as an actuating sleeve and is there opposed to the second end 30 of the main body 10, in particular to an outer retaining wall 14b running perpendicular to the axial direction x.

FIG. 9 shows an open disconnected position of the clutch 22 arranged at the first end 20 with an actuating element 32 positioned as close as possible to the second end 30. The actuating element 32 is also completely immersed in the enlarged inner diameter 31a of the crank sleeve 32. A force applied arm 35b of the lever 35 projects with respect to the actuating element 32 in its radial direction and can be gripped particularly well by an operator in this position. A spring element 40 designed as a tension spring element 42 engages with its end section 43 by means of a tension spring fastener 45 on the actuating element 32 and with its opposite end section 44 by means of a tension spring fastener 45 on the force applied arm 35b of the lever 35.

By pivoting movement of the force applied arm 35b in a direction facing away from the crank sleeve 31, the load arm 35a presses against the second end 30 and, as shown in FIG. 10, pushes the entire actuating element 32 away from the second end 30. After reaching the spaced position $X_2$ of the attachment point 33 with respect to second end 30, the clutch 22 is switched into a force-locked connection position at the first end 20 due to the force transmitted by the operator from the force transmission means 11.

However, the tension spring element 42 is only tensioned for the duration of a force applied by the operator.

As soon as the operator releases the crank handle 1 and thus also the actuating element 32, the tension spring element 42 pulls the lever 35 back into the starting position according to FIG. 9. Because the load arm 35a is connected to the second end 30 by load arm connection means 37 transmitting tensile forces, the actuating element 32 also moves back along axial direction x until a stop of the actuating element 32 within the enlarged inner diameter 31a is reached. In this position, the clutch 22 located at the first end 20 of the main body 10 is closed.

LIST OF REFERENCE NUMBERS 1 hand crank
10 main body
11 force transmission means
11a wire rope
11b case
12 interior main body
13 middle part of main body
14a inner retaining wall
14b outer retaining wall
15 opening
20 first end main body
21 connecting element
21b connecting bolt
22 clutch
23 release rod
24 torque receiving section
25 torque transmission section
26 Cross section torque transmission section
27 support piston release rod
28 support ring alignment rod
30 second end main body
31 crank sleeve
31a enlarged inner diameter
32 actuating element/actuating sleeve
33 attachment point force transmission means
34 adjusting device
35 lever
35a load arm
35b force applied arm
36 thrust bearing crank sleeve
37 load arm connection means
38 collar actuating element
40 spring element
41 compression spring element
42 tension spring element
43 end section
44 opposite end section
45 tension spring fastener
50 landing gear
51 input shaft
52 connecting shaft
53 outer sleeve
54 inner sleeve
55 support foot
56 mounting plate
x axial direction
$x_A$ drive path release rod
$x_S$ drive path actuating element
$x_V$ drive path connecting element
$X_1$ near position attachment point/second end
$X_2$ spaced position attachment point/second end

What is claimed is:

1. A hand crank for a landing gear, the hand crank comprising:
   a main body comprising a) a first end with a connecting element for fastening the hand crank to an input shaft of the landing gear and b) an opposite, second end configured to rotate the hand crank,
   wherein a clutch is arranged at the first end of the main body in a force flow between the first end of the main body and the connecting element, wherein the clutch is held in an open disconnected position and is moved into a force-locked connection position by operating an actuating element arranged at the second end, wherein the clutch and the actuating element are connected to one another via a force transmission means, wherein the actuating element has an attachment point for the force transmission means, and wherein in the open disconnected position of the clutch the attachment point is located in a close position ($X_1$) to the second end of the main body.

2. The hand crank according to claim 1, wherein the clutch has a release rod to which the force transmission means is attached.

3. The hand crank according to claim 2, wherein the release rod rotatably engages the connecting element and is formed with a torque receiving section.

4. The hand crank according to claim 3, wherein the clutch has a torque transmission section which is arranged stationary on the first end of the main body.

5. The hand crank according to claim 4, wherein the release rod is guided displaceably in an axial direction (x) with respect to the main body and when actuating the actuating element the torque receiving section engages the torque transmission section.

6. The hand crank according to claim 5, wherein the torque transmission section has a cross section shaped complementary to the torque receiving section.

7. The landing gear according to claim 6, wherein the clutch is held by a spring element in the open disconnected position, and wherein the actuating element is mounted displaceably with respect to the second end of the main body, in particular in an axial elongation of the second end.

8. A landing gear with an input shaft and a hand crank according to claim 6, wherein the landing gear comprises an outer sleeve and an inner sleeve guided telescopically therein, the inner sleeve having a support foot at one end thereof, wherein the inner sleeve is movable relative to the outer sleeve by actuating the hand crank in the force-locked connection position of the clutch.

9. The hand crank according to claim 1, wherein the clutch is held by a spring element in the open disconnected position.

10. The hand crank according to claim 1, wherein the actuating element is mounted displaceably with respect to the second end of the main body, in particular in an axial elongation of the second end.

11. The hand crank according to claim 1, wherein in the force-locked connection position of the clutch the attachment point is located in a spaced position ($X_2$) to the second end of the main body.

12. The hand crank according to claim 1, wherein the attachment point comprises an adjusting device for adjusting the length of the force transmission means.

13. The hand crank according to claim 1, wherein a lever is pivotally mounted on the actuating element or on a crank sleeve, wherein a load arm is supported at the second end of the main body.

14. A landing gear with an input shaft and a hand crank according to claim 1, wherein the landing gear comprises an outer sleeve and an inner sleeve guided telescopically therein, the inner sleeve having a support foot at one end thereof, wherein the inner sleeve is movable relative to the outer sleeve by actuating the hand crank in the force-locked connection position of the clutch.

15. The landing gear according to claim 1, wherein the attachment point comprises an adjusting device for adjusting the length of the force transmission means, and wherein a lever is pivotally mounted on the actuating element, wherein a load arm is supported at the second end of the main body.

16. A landing gear with an input shaft and a hand crank according to claim 15, wherein the landing gear comprises an outer sleeve and an inner sleeve guided telescopically therein, the inner sleeve having a support foot at one end thereof, wherein the inner sleeve is movable relative to the outer sleeve by actuating the hand crank in the force-locked connection position of the clutch.

17. A hand crank for a landing gear, the hand crank comprising:

a main body comprising a) a first end with a connecting element for fastening the hand crank to an input shaft of the landing gear and b) an opposite, second end configured to rotate the hand crank, wherein a clutch is arranged at the first end of the main body in a force flow between the first end of the main body and the connecting element, wherein the clutch is held in an open disconnected position and is moved into a force-locked connection position by operating an actuating element arranged at the second end, wherein the clutch and the actuating element are connected to one another via a force transmission means, wherein the clutch has a release rod to which the force transmission means is attached, wherein the release rod rotatably engages the connecting element and is formed with a torque receiving section, wherein the clutch has a torque transmission section which is arranged stationary on the first end of the main body, wherein the release rod is guided displaceably in an axial direction (x) with respect to the main body and when actuating the actuating element the torque receiving section engages the torque transmission section, wherein the torque transmission section has a cross section shaped complementary to the torque receiving section, wherein the clutch is held by a spring element in the open disconnected position, and wherein the actuating element is mounted displaceably with respect to the second end of the main body, in particular in an axial elongation of the second end, and wherein the actuating element has an attachment point for the force transmission means, wherein in the open disconnected position of the clutch the attachment point is located in a close position ($X_1$) to the second end of the main body, and wherein in the force-locked connection position of the clutch the attachment point is located in a spaced position ($X_2$) to the second end of the main body.

* * * * *